(12) United States Patent
Yu et al.

(10) Patent No.: US 9,966,804 B2
(45) Date of Patent: May 8, 2018

(54) OUTER-ROTOR PERMANENT MAGNET BRUSHLESS MOTOR

(71) Applicant: Industrial Technology Research Institute, Hsin-Chu (TW)

(72) Inventors: Shou-Long Yu, Taoyuan (TW); Yang-Guang Liu, Xinfeng Township (TW); Chia-Hao Hsu, Tainan (TW); Liang-Chiao Huang, Puxin Township (TW); Yu-Choung Chang, Jhudong Township (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 267 days.

(21) Appl. No.: 14/722,723

(22) Filed: May 27, 2015

(65) Prior Publication Data

US 2016/0164349 A1 Jun. 9, 2016

(30) Foreign Application Priority Data

Dec. 5, 2014 (TW) ................................ 103142407

(51) Int. Cl.
*H02K 1/06* (2006.01)
*H02K 1/14* (2006.01)
*H02K 29/03* (2006.01)

(52) U.S. Cl.
CPC ............. *H02K 1/146* (2013.01); *H02K 29/03* (2013.01); *H02K 2213/03* (2013.01)

(58) Field of Classification Search
CPC ..... H02K 29/03; H02K 1/146; H02K 2213/03

USPC .................................................. 310/216.093
See application file for complete search history.

(56) References Cited

U.S. PATENT DOCUMENTS

| 5,977,680 A | 11/1999 | Lin |
| 8,350,439 B2 | 1/2013 | Yoshikawa et al. |
| 2007/0278892 A1* | 12/2007 | Lee .................. H02K 1/185 310/216.044 |
| 2009/0072648 A1 | 3/2009 | Li |

(Continued)

FOREIGN PATENT DOCUMENTS

| CN | 1653674 A | 8/2005 |
| CN | 1838509 A | 9/2006 |

(Continued)

OTHER PUBLICATIONS

Taiwan Intellectual Property Office, Office Action dated Nov. 12, 2015.

(Continued)

*Primary Examiner* — Forrest M Phillips
(74) *Attorney, Agent, or Firm* — WPAT, PC

(57) ABSTRACT

An outer-rotor permanent magnet brushless motor is disclosed, which comprises an outer-rotor and an inner-stator. The outer-rotor configured with P poles, P is a natural number and denotes a multiple of 4. The inner-stator has a stator axle, and S teeth which configured on outer surface of stator, S=P−1, S is a natural number. A circle is formed about a center of the stator axle from the center of the outer end surface. A correction angle a1 and an original angle a are defined from the center of the outer end surface. T The ratio of a1/a is defined by the following formula: $0.2 < (a1/a) < 0.6$.

5 Claims, 4 Drawing Sheets

(56) References Cited

U.S. PATENT DOCUMENTS

| | | | | |
|---|---|---|---|---|
| 2014/0197708 A1* | 7/2014 | Noda | ................ | H02K 29/03 |
| | | | | 310/156.38 |
| 2015/0349595 A1* | 12/2015 | Jiang | ................ | H02K 5/20 |
| | | | | 310/43 |
| 2016/0197525 A1* | 7/2016 | Cho | ................ | H02K 1/146 |
| | | | | 310/60 R |
| 2016/0329762 A1* | 11/2016 | Li | ................ | H02K 1/2786 |

FOREIGN PATENT DOCUMENTS

| | | |
|---|---|---|
| CN | 101951105 A | 1/2011 |
| CN | 102064654 | 5/2011 |
| CN | 202150780 U | 2/2012 |
| CN | 102738934 A | 10/2012 |
| TW | 404620 | 9/2000 |
| TW | 522627 | 3/2003 |
| TW | I270246 | 1/2007 |
| TW | M314969 | 7/2007 |
| TW | M325724 | 1/2008 |
| TW | M327601 | 2/2008 |
| TW | I343689 | 7/2008 |
| TW | I373901 | 2/2010 |
| TW | I325214 | 5/2010 |
| TW | I337439 | 2/2011 |
| TW | M461248 | 9/2013 |
| TW | 201424203 | 6/2014 |

OTHER PUBLICATIONS

State Intellectual Property Office of the People's Republic of China, "Office Action", dated Nov. 16, 2017.

\* cited by examiner

OUTER-ROTOR PERMANENT MAGNET BRUSHLESS MOTOR

CROSS REFERENCE TO RELATED APPLICATION

This application also claims priority to Taiwan Patent Application No. 103142407 filed in the Taiwan Patent Office on Dec. 5, 2014, the entire content of which is incorporated herein by reference.

TECHNICAL FIELD

The present disclosure relates to an outer-rotor permanent magnet brushless motor, and more particularly, to an outer-rotor permanent magnet brushless motor capable of effectively reducing cogging torque.

BACKGROUND

It is generally known that the permanent magnet motor has the following advantages: it is comparatively simple in structure, reliable, smaller in size, lower operation loss, high operation efficiency, and can be designed with various shapes and sizes, by that permanent magnet motors can be adapted for various applications in many fields, including aerospace industry, defense industry, agriculture, and so on. However, the permanent magnet motor is still short in the performance relating to trapezoidal-shaped back electromotive force (EMF) and cogging torque. Cogging torque of electrical motors is the torque due to the interaction between the permanent magnets of the rotor and the stator slots of a permanent magnet motor, and its periodicity per revolution depends on the number of magnetic poles and the number of teeth on the stator. Cogging torque is an undesirable component for the operation of such a motor. It is generally prominent at lower speeds, with the symptom of vibration and noise during operation. Cogging torque is especially obvious in the operation of a outer-rotor permanent magnet motor, since the rotor magnets of a outer-rotor permanent magnet brushless motor are attached to an inner surface of its rotor yoke in a surface-mount manner, resulting the waveform of the outer-rotor permanent magnet brushless motor to be a trapezoidal wave.

Conventionally, most prior arts and disclosed papers for reducing cogging torque and modifying back-EMF are performed based upon the arrangement of rotor magnets in an inner-rotor permanent magnet brushless motor. Nevertheless, the arc-shaped rotor magnet in an outer-rotor permanent magnet brushless motor will cause high manufacturing cost for modifying such rotor magnet and difficulty in tolerance control as well.

SUMMARY

In an embodiment, the present disclosure provides an outer-rotor permanent magnet brushless motor, which comprises an outer-rotor and an inner-stator. The outer-rotor is configured with P poles, P is a natural number and denotes a multiple of 4. The inner-stator has a stator axle, and S teeth, whereas the plural teeth are configured on outer surface of inner-stator, S=P−1, S is a natural number. Each tooth is configured with a boot part which has an outer end surface facing the outer-rotor. A circle is formed about a center of the stator axle from the center of the outer end surface. A correction angle a1 and an original angle a are defined from the center of the outer end surface. The first arc-surface is substantially a portion of the outer end surface defined within the coverage of the correction angle a1. The second arc-surfaces are disposed stretching away the circle toward to the stator axle from the position where the second arc-surfaces are connected to the first arc-surface. The width of the boot part is defined by the coverage of the original angle a. The ratio of a1/a is defined by the following formula: $0.2 < (a1/a) < 0.6$.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
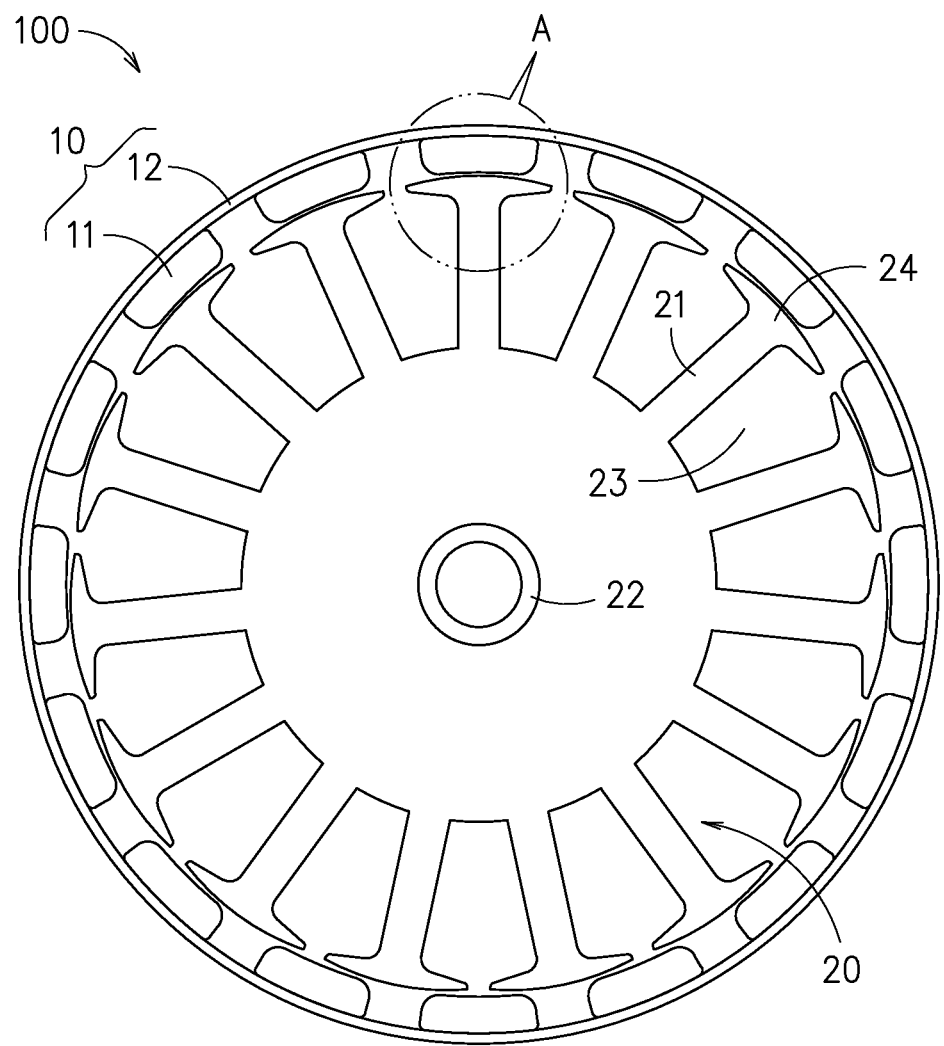
FIG. 1 is a schematic diagram showing an outer-rotor permanent magnet brushless motor according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
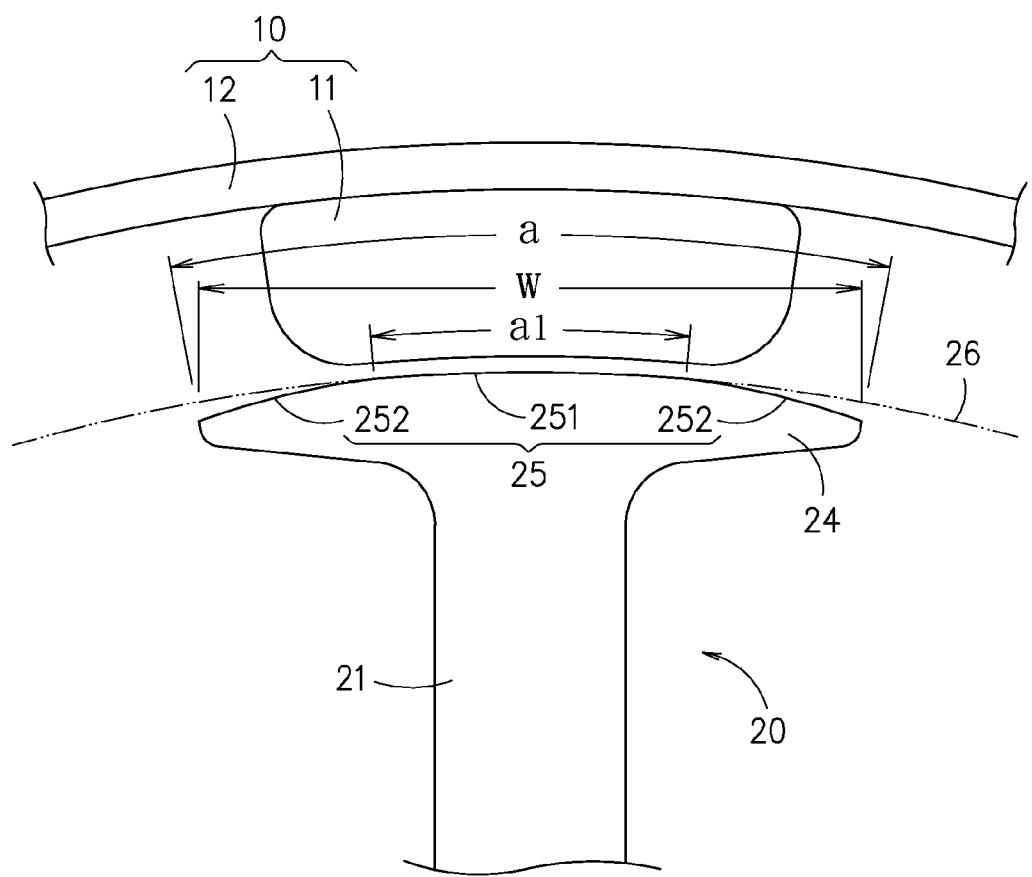
FIG. 2 is an enlarged diagram showing the area A of FIG. 1.

Please refer to FIG. 1 and FIG. 2, which are schematic diagrams showing an outer-rotor permanent magnet brushless motor according to an embodiment of the present disclosure. In this embodiment, an outer-rotor permanent magnet brushless motor 100 is disclosed, which comprises: an outer-rotor 10 and an inner-stator 20.

The outer-rotor 10 is configured with P poles 11, whereas P is a natural number and denotes a multiple of 4. In addition, the outer-rotor 10 is configured with a rotor yoke 12 that is coupled to the plural poles 11.

The inner-stator 20 has a stator axle 22 and S teeth 21, whereas the S teeth 21 are configured on outer surface of inner-stator 20, and S is a natural number while S=P−1. The plural teeth 21 are disposed at positions opposite to the stator axle 22 and are distributed peripherally and uniformly in a circumferential direction of the inner-stator 20. In addition, the inner-stator 20 is disposed inside the outer-rotor 10 for enabling the outer-rotor 10 to rotate about the stator axle 22. The inner-stator 20 further have a plurality of slots 23, which are formed in an amount equal to that of the teeth 21 at positions opposite to the stator axle 22 while being distributed peripherally in a circumferential direction of the inner-stator 20.

In this embodiment, there are sixteen poles 11 being formed on the outer-rotor 10, while there are fifteen teeth 21 and also fifteen slots that are formed on the inner-rotor 20.

Moreover, each tooth 21 is configured with a boot part 24, which has an outer end surface 25 facing the outer-rotor 10. A circle 26 is formed about a center of the stator axle 22 from the center of the outer end surface 25. A correction angle a1 and an original angle a are defined from the center of the outer end surface 25. The outer end surface 25 is composed with a first arc-surface 251, and two second arc-surfaces 252 that connect respectively to the opposite ends of the first arc-surface 251. The first arc-surface 251 is substantially a portion of the outer end surface 25 defined within the coverage of the correction angle a1. The second arc-surfaces 252 are disposed stretching away the circle 26 toward to the stator axle 22 from the position where the second arc-surfaces 252 are connected to the first arc-surface 251. The width W of the boot part 24 is defined by the coverage of the original angle a. The ratio of a1/a is defined by the following formula: 0.2<(a1/a)<0.6. Thereby, each boot part 24 is tapering from the center of the outer end surface 25 toward the two opposite ends of the boot part 24.

The outer-rotor permanent magnet brushless motor 100 of the present disclosure is designed for improving the cogging torque and the EMF waveform, and thus enhancing the performance of the outer-rotor motor. It is noted that the cogging torque can be calculated using the following formula (1) and its smoothness is calculated using the following formula (2):

$$C_T = \frac{PQ_S}{N_C} = \frac{PQ_S}{L_{CM}(P, Q_S)} \quad (1)$$

$$N_P = \frac{P}{HCF(P, Q_S)} \quad (2)$$

wherein, P is the number of poles formed on the outer-rotor;

$Q_S$ is the number of slots formed on the inner-stator;

$LCM(P,Q_S)$ is the lowest common multiple of P and $Q_S$. Accordingly, the smaller the $C_T$ of formula (1) is, the smaller the peak of the cogging torque will be; and the larger the $N_P$ of formula (2) is, the cogging torque is smoother.

The correlation between the cogging torque and slot/pole ratio is represented in the following table 1: ($N_C$ is the lowest common multiple)

| P | 4 | 8 | 10 | 10 | 10 | 12 | 12 | 12 | 14 | 14 | 16 | 16 |
|---|---|---|----|----|----|----|----|----|----|----|----|----|
| $Q_S$ | 3 | 9 | 9 | 12 | 15 | 9 | 15 | 18 | 12 | 15 | 15 | 18 |
| $N_C$ | 12 | 72 | 90 | 30 | 30 | 36 | 60 | 36 | 84 | 210 | 240 | 144 |
| $C_T$ | 1 | 1 | 1 | 4 | 5 | 3 | 3 | 6 | 2 | 1 | 1 | 2 |

Whereas, the correlation between the smoothness of cogging torque and slot/pole ratio is represented in the following table 2: (HCF is the highest common factor)

| P | 4 | 8 | 10 | 10 | 10 | 12 | 12 | 12 | 14 | 14 | 16 | 16 |
|---|---|---|----|----|----|----|----|----|----|----|----|----|
| $Q_S$ | 3 | 9 | 9 | 12 | 15 | 9 | 15 | 18 | 12 | 15 | 15 | 18 |
| HCF | 1 | 1 | 1 | 2 | 5 | 3 | 3 | 6 | 2 | 1 | 1 | 2 |
| $N_P$ | 4 | 8 | 10 | 5 | 2 | 4 | 4 | 2 | 7 | 14 | 16 | 8 |

As shown in table 1, when the numbers of the poles and slots differ by one, the peak of the cogging torque is at its minimum; and as shown in table 2, the smoothness of cogging torque increases with the increasing of the numbers of the poles and slots. Accordingly, the cogging torque can be effectively reduced with satisfactory smoothness in a condition of 16-pole/15-slot configuration, i.e. in a condition matching to the motor configuration of the present disclosure: the outer-rotor is configured with P poles, P is a natural number and denotes a multiple of 4, while the inner-stator has a stator axle, and S teeth, whereas the plural teeth are configured on outer surface of inner-stator, S=P−1, S is a natural number.

Figure 3:
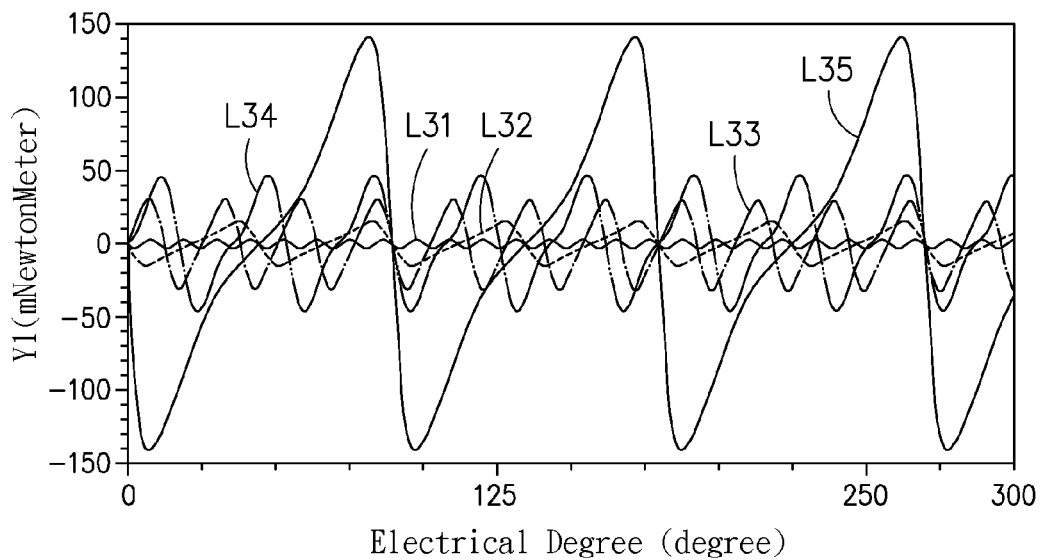
FIG. 3 is a diagram showing cogging torques of different pole/slot configurations.

Please refer to FIG. 3, which is a diagram showing cogging torques Y1 of different pole/slot configurations. In FIG. 3, the curve L31 represents a 16-pole/15-slot configuration; the curve L32 represents a 12-pole/15-slot configuration; the curve L33 represents a 14-pole/12-slot configuration; the curve L34 represents a 10-pole/12-slot configuration; and the curve L35 represents a 12-pole/18-slot configuration. As shown in FIG. 3, the peak of the cogging torque is at its minimum in the 16-pole/15-slot configuration.

Figure 4:
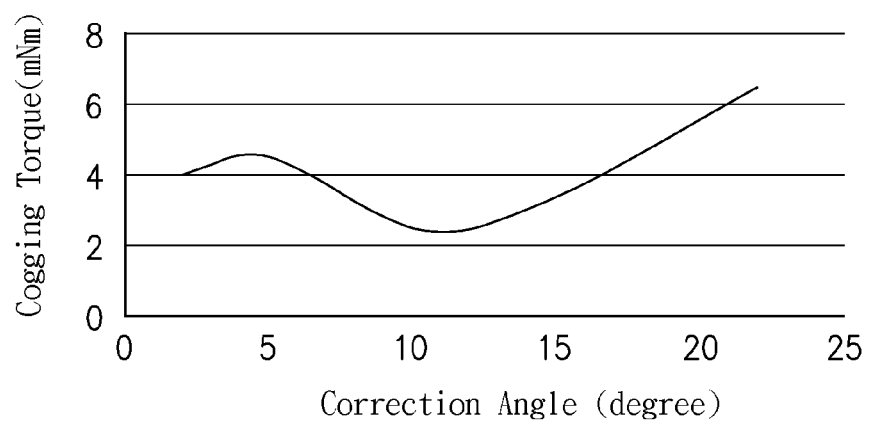
FIG. 4 is a diagram showing the relationship between cogging torque and correction angle.

In the present disclosure, the improvement of EMF waveform is analyzed and verified using the 16-pole/15-slot configuration with improvement to the arc design in stator. In FIG. 2, assuming the origin angle a of each boot part is 22 degrees (360/15=24, subtracting the distance between two neighboring boot parts 24), and a comparison is performed between the designs of different correction angles a1, i.e. 2 degrees, 5 degrees, 10 degrees, and 14 degrees, using the same origin angle a of 22 degrees. Please refer to FIG. 4, which is a diagram showing the relationship between cogging torque and correction angle. As shown in FIG. 4, when the correction angles a1 is defined at 10 degrees and 14 degrees, the cogging torque can be decreased effectively, but when the correction angles a1 is defined at 2 degrees and 5 degrees, the cogging torque is increasing instead. Thus, the correction angles a1 must be restricted, and in the present disclosure, the ratio of a1/a is defined by the following formula: 0.2<(a1/a)<0.6.

Figure 5:
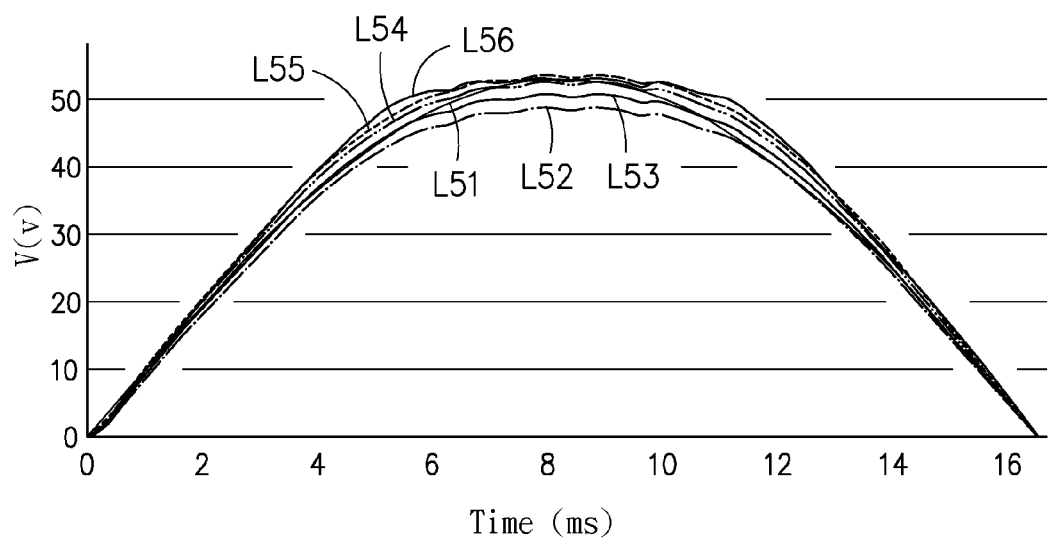
FIG. 5 is a diagram showing different EMF waveforms.
Figure 6:
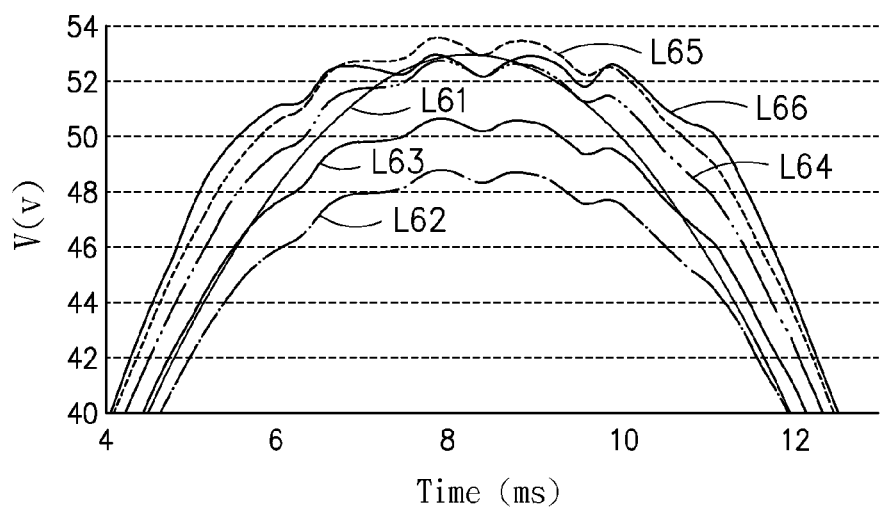
FIG. 6 is an enlarged diagram showing a tip portion of FIG. 5.

Please refer to FIG. 5 and FIG. 6, which are diagrams showing different EMF waveforms. As shown in FIG. 5 and FIG. 6, the curves L51 and L61 represent an ideal waveform; the curves L52 and L62 represent the condition that the correction angles a1 is defined at 2 degrees; the curves L53 and L63 represent the condition that the correction angles a1 is defined at 5 degrees; the curves L54 and L64 represent the condition that the correction angles a1 is defined at 10 degrees; the curves L55 and L65 represent the condition that the correction angles a1 is defined at 14 degrees; and the curves L56 and L66 represent the condition that the correction angles a1 is defined at 22 degrees. It is noted that when the correction angles a1 is defined at 2 degrees and 5 degrees in the curves L52 and L53, the EMF peak is decreased, which cause the performance to decrease accordingly; when the correction angles a1 is defined at 14 degrees and 22 degrees in the curves L55 and L56, the EMF waveforms are trapezoidal waves; and when the correction angles a1 is defined at 10 degrees and 22 degrees in the curves L54, a good arc design can effectively improve the EMF waveform with adversely affecting the motor performance. Thus, the EMF waveform can be effectively modified when the ratio of a1/a is defined by the following formula: 0.2<(a1/a)<0.6.

It is noted that the foregoing 16-pole/15-slot configuration is only one embodiment for illustration. All the other configurations can be an embodiment of the present disclosure only of them conform to the following requirements: the outer-rotor configured with P poles, P is a natural number and denotes a multiple of 4, and the inner-stator has a stator axle, and S teeth which configured on outer surface of stator, S=P−1, S is a natural number; and the ratio of a1/a is defined by the following formula: 0.2<(a1/a)<0.6.

To sum up, in the outer-rotor permanent magnet brushless motor of the present disclosure, the pole/slot configuration is regulated and a arc-design for stator is provided for enabling its EMF waveform to approach a sine wave while reducing the cogging torque. Thus, the problems of cogging torque and EMF waveform modification for the outer-rotor permanent magnet brushless motor can be solved. As the EMF waveform of the present disclosure can approach an ideal sine wave, the performance can be improved with the sine wave control of a driver, and also the ripple can also be modified effectively. In addition, as the EMF waveform is modified by the modification of the boot part in the present disclosure, not only the manufacturing cost can be reduced, but also the iron loss to the silicon steel of the inner-stator can be minimized, resulting that the performance efficiency of the motgor is enhanced.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. An outer-rotor permanent magnet brushless motor, comprising:
    an outer-rotor, configured with P poles, and P being a natural number denoting a multiple of 4; and
    an inner-stator, having a stator axle, and S teeth configured on an outer surface of the inner-stator in a manner that S=P−1, S being a natural number;
    wherein, each of the S teeth is configured with a boot part spanning a width defined by the coverage of a circular arc centered at a rotational axis of the stator axle subtending an original angle a, each boot part having a smooth non-chamfered outer end surface facing the outer-rotor, each outer end surface comprising:
        a first arc-surface defined as a portion of the outer end surface on the circular arc, subtending a correction angle a1; and
        two second arc-surfaces defined as the portions of the outer end surface respectively connected to the opposite ends of the first arc-surface and closer to the rotational axis of the stator axle than the first arc-surface; and
    wherein, the first arc-surface and the two second arc-surfaces are formed with the ratio of (a1/a) between 0.2 and 0.6.

2. The outer-rotor permanent magnet brushless motor of claim 1, wherein each of the boot parts is formed with a thickness that is tapering from the center of its outer end surface toward the two opposite ends of the boot part.

3. The outer-rotor permanent magnet brushless motor of claim 1, wherein the inner-stator is disposed inside the outer-rotor, and the outer-rotor is configured with a rotor yoke that is coupled to the poles for enabling the outer-rotor to rotate about the stator axle.

4. The outer-rotor permanent magnet brushless motor of claim 1, wherein the plural teeth are disposed at positions opposite to the stator axle and are distributed peripherally and uniformly in a circumferential direction of the inner-stator.

5. The outer-rotor permanent magnet brushless motor of claim 1, wherein the inner-stator further have a plurality of slots, being formed in an amount equal to that of the teeth at positions opposite to the stator axle while being distributed peripherally in a circumferential direction of the inner-stator.

* * * * *